US010564847B1

(12) United States Patent
Taylor et al.

(10) Patent No.: US 10,564,847 B1
(45) Date of Patent: Feb. 18, 2020

(54) DATA MOVEMENT BULK COPY OPERATION

(71) Applicant: EMC IP HOLDING COMPANY LLC, Hopkinton, MA (US)

(72) Inventors: Alan L. Taylor, Cart, NC (US); Karl M. Owen, Chapel Hill, NC (US); H. Austin Spang, IV, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/461,350

(22) Filed: Mar. 16, 2017

Related U.S. Application Data

(63) Continuation-in-part of application No. 14/501,518, filed on Sep. 30, 2014, now abandoned.

(51) Int. Cl.
*G06F 3/06* (2006.01)
*G06F 12/0862* (2016.01)

(52) U.S. Cl.
CPC ............ *G06F 3/0604* (2013.01); *G06F 3/065* (2013.01); *G06F 3/067* (2013.01); *G06F 12/0862* (2013.01); *G06F 2212/602* (2013.01)

(58) Field of Classification Search
CPC ... G06F 3/065; G06F 12/0806; G06F 12/0862
See application file for complete search history.

(56) References Cited

U.S. PATENT DOCUMENTS

| 7,865,468 B2* | 1/2011 | Naineni | G06F 17/30132 707/636 |
| 2010/0011176 A1* | 1/2010 | Burkey | G06F 3/0613 711/157 |
| 2011/0246434 A1* | 10/2011 | Cheenath | G06F 17/3038 707/703 |
| 2012/0066456 A1* | 3/2012 | Rabinovitch | G06F 12/0862 711/137 |

* cited by examiner

*Primary Examiner* — Ann J Lo
*Assistant Examiner* — Michelle T Bechtold
(74) *Attorney, Agent, or Firm* — Krishendu Gupta

(57) ABSTRACT

Techniques are described for performing a copy operation. A first request is received to perform a copy operation to copy source data from a source area to a target area. The first request is partitioned into a plurality of other requests. Each of the plurality of other requests being a request to copy a portion of source data located in the source area to a corresponding location in the target area. A first number of the other requests is issued. Responsive to the issued requests, a copy operation is performed to copy a portion of the source data from the source area to the target area. Completion of a second number of the issued other requests is detected. The second number corresponds to a fraction of the first number such that the second number is greater than one and less than the first number. Upon detecting completion of the second number, a third number of the other requests is issued to copy another portion of the source data from the source area to the target area. The third number corresponding to the second number of the issued other requests detected as complete.

12 Claims, 7 Drawing Sheets

DATA MOVEMENT BULK COPY OPERATION

RELATED APPLICATION

This application is a continuation-in-part application claiming priority to co-pending U.S. patent application Ser. No. 14/501,518, filed Sep. 30, 2014, entitled "DATA MOVEMENT BULK COPY OPERATION", the entirety of which patent application is hereby incorporated by reference herein.

TECHNICAL FIELD

This application relates generally to data storage. More specifically, this application relates to techniques used in connection with performing copy operations in storage environments.

BACKGROUND OF THE INVENTION

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage system containing a plurality of host interface units, disk drives, and disk interface units. Such storage systems are provided, for example, by EMC Corporation of Hopkinton, Mass. The host systems access the storage system through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units, logical devices, or logical volumes (LVs). The logical disk units may or may not correspond to the actual disk drives. Allowing multiple host systems to access the storage system allows the host systems to share data stored therein.

In connection with data storage, a host may in one approach issue I/O operations to copy data from a source location on a source device to a target location on a target device. The source and target devices may be on the same or different data storage systems. To perform the operation, the host may issue a read command to read the data to be copied from the source location of the source device from a source data storage system. In response, the source data storage system may send the requested data across a network connection to the host. The host may then issue a write command to a target data storage system including the target device. For the write operation, the host transmits the data to the target data storage system whereby the target data storage system writes the data to the target location of the target device.

It will be appreciated by those skilled in the art that a problem with the above approach to copying data from source to target location is the consumption of host computer resources. For example, host computer memory, bandwidth to and from host computers, etc. However, this issue can be addressed by another approach to copying data from source to target location known herein as offloaded data transfer (ODX) in which data movement operations are offloaded from host computers. That is, rather than copy data from a data storage source to a host computer (where the data is buffered), and then from the host computer to a data storage destination, data is copied from the data storage source directly to the data storage destination. Such offloading of data movement operations saves host computer resources.

In one example of the ODX approach, the host computer provides a "populate token" (PT) request which identifies, to the data storage system, particular host data for copying. The data storage system returns a token to the host computer in response to the PT request. Thereafter, devices are able to identify the particular host data using the token. For example, the host computer can subsequently provide to the data storage system a "write using token" (WUT) request which may, inter alia, include (i) the token and (ii) a data storage destination. The data storage system responds to the WUT request by performing a WUT operation which copies the particular host data from the data storage source directly to the data storage destination without buffering the particular host data on the host computer. Windows ODX is an offloaded data transfer technology which is provided by Microsoft Corporation of Redmond, Wash. and which operates in a manner similar to that described above.

Although, the above ODX approach does address the issue of host resource consumption, it can suffer when dealing with a large request. For example, upon receipt, the request may be partitioned into multiple sub-requests that are issued sequentially. It will be appreciated that when these requests complete the originator may immediately start the next request and so on. However, if the multiple requests are completing around the same time on different cores then it is possible that the next round of requests will be out of order. This can cause problems in the event that a pre-fetcher is deployed to detect sequential reads and get the next piece of data ready. In this scenario, the out of order requests can confuse the pre-fetcher by causing it to switch between forward and reverse pre-fetching. This can hurt performance.

SUMMARY OF THE INVENTION

There is disclosed a method, comprising: receiving, by processing circuitry, a first request to perform a copy operation to copy source data from a source area to a target area; partitioning, by processing circuitry, the first request into a plurality of other requests, each of the plurality of other requests being a request to copy a portion of source data located in the source area to a corresponding location in the target area; issuing, by processing circuitry, a first number of the other requests; responsive to the issued requests, performing, by processing circuitry, a copy operation to copy a portion of the source data from the source area to the target area; detecting, by processing circuitry, completion of a second number of the issued other requests, wherein the second number corresponds to a fraction of the first number such that the second number is greater than one and less than the first number; and upon detecting completion of the second number, issuing, by processing circuitry, a third number of the other requests to copy another portion of the source data from the source area to the target area, wherein the third number corresponds to the second number of the issued other requests detected as complete.

There is also disclosed an apparatus, comprising: memory; and processing circuitry coupled to the memory, the memory storing instructions which, when executed by the processing circuitry, cause the processing circuitry to: receive a first request to perform a copy operation to copy source data from a source area to a target area; partition the first request into a plurality of other requests, each of the plurality of other requests being a request to copy a portion of source data located in the source area to a corresponding location in the target area; issue a first number of the other requests; responsive to the issued requests, perform a copy operation to copy a portion of the source data from the source area to the target area; detect completion of a second number of the issued other requests, wherein the second number corresponds to a fraction of the first number such that the second number is greater than one and less than the first number; and upon detecting completion of the second number, issue a third number of the other requests to copy another portion of the source data from the source area to the target area, wherein the third number corresponds to the second number of the issued other requests detected as complete.

There is also disclosed a computer program product including a set of non-transitory, computer-readable media having instructions which, when executed by processing circuitry, cause the processing circuitry to perform a method, the method comprising: receiving a first request to perform a copy operation to copy source data from a source area to a target area; partitioning the first request into a plurality of other requests, each of the plurality of other requests being a request to copy a portion of source data located in the source area to a corresponding location in the target area; issuing a first number of the other requests; responsive to the issued requests, performing a copy operation to copy a portion of the source data from the source area to the target area; detecting completion of a second number of the issued other requests, wherein the second number corresponds to a fraction of the first number such that the second number is greater than one and less than the first number; and upon detecting completion of the second number, issuing a third number of the other requests to copy another portion of the source data from the source area to the target area, wherein the third number corresponds to the second number of the issued other requests detected as complete.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

Figure 1:
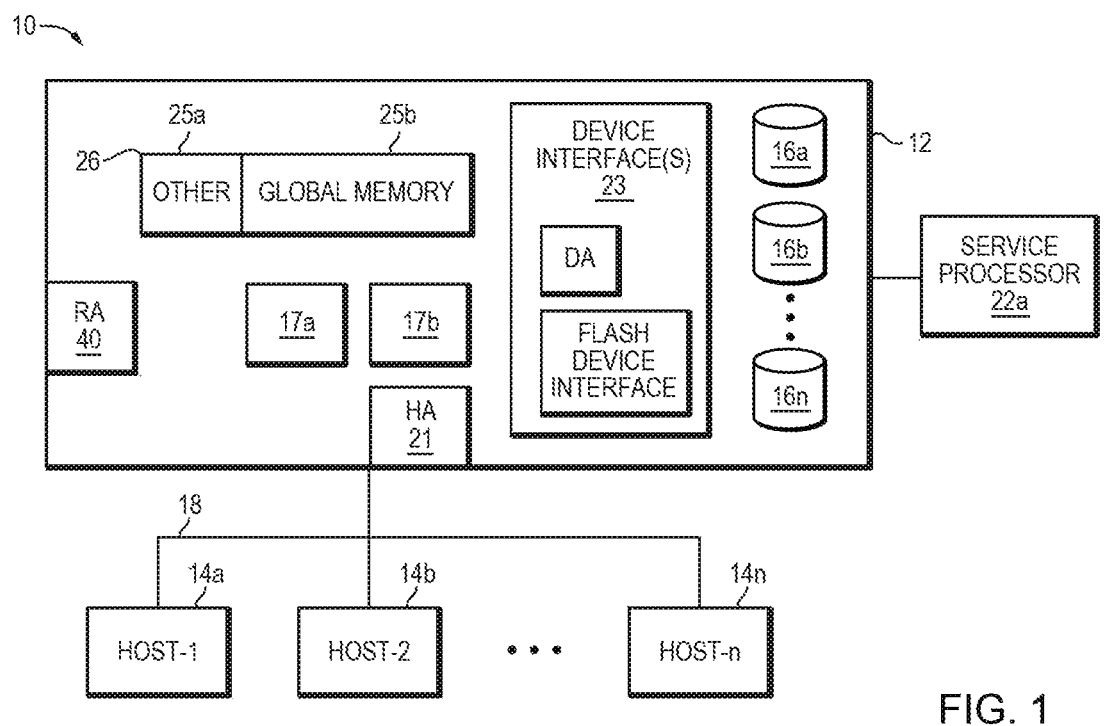
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14*a*-14*n* through communication medium 18. In this embodiment of the system 10, and the n hosts 14*a*-14*n* may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14*a*-14*n* may access and communicate with the data storage system 12, and may also communicate with other components included in the system 10.

Each of the host systems 14*a*-14*n* and the data storage system 12 included in the system 10 may be connected to the communication medium 18 by any one of a variety of connections as may be provided and supported in accordance with the type of communication medium 18. The processors included in the host computer systems 14*a*-14*n* may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14*a*-14*n* and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14*a*-14*n* may issue a data request to the data storage system 12 to perform a data operation. For example, an application executing on one of the host computers 14*a*-14*n* may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system may be a single unitary data storage system, such as single data storage array, including two main storage processors or computer processing units (CPUs). Techniques herein may be more generally use in connection with any one or more data storage system each including a different number of main processors than as illustrated herein. The data storage system 12 may be a data storage array, such as a VNX® data storage array by EMC Corporation of Hopkinton, Mass., including a plurality of data storage devices 13a-13n and two main storage processors or CPUs 17a, 17b. The processors 17a, 17b may be CPUs included in the data storage system for processing requests and commands. In connection with performing techniques herein, an embodiment of the data storage system may include multiple service processors including more than two main CPUs as described. The VNX® data storage system mentioned above may include two processors 17a, 17b for performing processing in connection with servicing requests. Additionally, the two processors 17a, 17b may be used in connection with failover processing when communicating with the management system 16. More generally, a data storage system may include one or more such main CPUs such as 17a, 17b.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, volumes, or logical units (LUNs). The LUNs may or may not correspond to the actual physical devices or drives 16a-16n. For example, one or more LUNs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN(s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

The device interface, such as a DA, performs I/O operations on a drive 16a-16n. In the following description, data residing on an LUN may be accessed by the device interface following a data request in connection with I/O operations that other directors originate. Data may be accessed by LUN in which a single device interface manages data requests in connection with the different one or more LUNs that may reside on a drive 16a-16n.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

With reference to FIG. 1, components of the data storage system may communicate using GM 25b. For example, in connection with a write operation, an embodiment may first store the data in cache included in a portion of GM 25b, mark the cache slot including the write operation data as write pending (WP), and then later destage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

In connection with a data storage system, one operation that may be performed is to copy data from a source area to a target area whereby both of the foregoing may be included in the same data storage system. Generally, the source area may comprise one or more source ranges each corresponding to a possibly different LBA (logical block address) range of a source device (e.g., LUN). In a similar manner, the target area may comprise one or more target ranges each corresponding to a possibly different LBA range of a target device (e.g., LUN). As will be described in more detail herein, each of the source ranges may be on the same or a different source device than other source ranges, and each of the target ranges may be on the same or a different target device than other target ranges. Furthermore, the copy operation may result from an originating request within the data storage system (e.g., data storage system internally generated the copy operation) as well as external from the data storage system (e.g., issued by an external client such as a host). In description herein, the copy operation may also be referred to as a bulk copy operation due to the data portions copied from possibly many disparate different source logical address locations of source devices (e.g., the source area) to possibly many disparate different target logical address locations of target devices (e.g., the target area). In one embodiment, each source range for a particular source device may be expressed using a starting offset and length whereby starting offset denotes the starting offset of the source range on the particular source device and the length denotes the size or span of the source range. Each source range (expressed using a starting offset and length) and associated source device may be specified as a triple or set of location information including the source device, starting offset and length. In a similar manner, each target range (expressed using a starting offset and length) and associated target device may be specified as a triple or set of location information. In an embodiment in accordance with techniques herein, the size of the data portion identified by each such triple or set of location information may differ. However, the total length or size represented by all triples of the source area may match the total length of size represented by all triples of the target area. Alternatively, an embodiment may not require the total length or size of the source area to match the total length or size of the target area and may perform additional processing in the case when the foregoing lengths do not match. For example, if the target area is smaller than the source area, an embodiment may reiterate or repeat usage of the source area data as needed to fill the target area. The foregoing and other details regarding the bulk copy operation in an embodiment in accordance with techniques herein are described in following paragraphs.

As a first example, consider a request to perform a bulk copy operation originating from a client, such as a host, that is external with respect to the data storage system whereby the source and target areas of the copy operation are included in the same data storage system.

In this example, the host may want to copy data from a source area to a target area. As noted elsewhere herein, the source area (including the source data to be copied) may include one or more source ranges. Each source range itself may specify a contiguous logical address range of a source device. However, each source range with respect to another source range may not be so contiguously located on the same source device. In a similar manner, the target area may be expressed as one or more target ranges. Each target range itself may specify a contiguous logical address range of a target device. However, each target range with respect to another target range may not be so contiguously located on the same target device. Furthermore, each of the foregoing source and target ranges may possibly be located on different devices (e.g., different LUN) in the data storage system.

What will be described is use of a token-based exchange of commands between the host and the data storage system whereby the source area may be represented using a token. For simplicity, initial discussion may refer to a single source device including all the source ranges and a single target device including all target ranges. Subsequent discussion expands on the initial discussion whereby each of the source and target ranges may be located on a different device within the data storage system.

Figure 2:
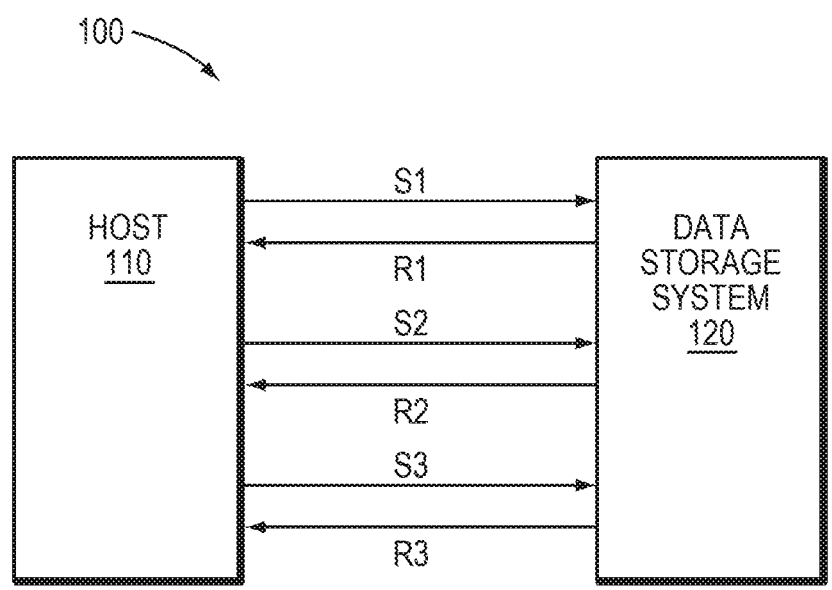
FIG. 2 is an example of messages that may be exchanged between a host and data storage system in an embodiment in accordance with techniques herein.

With reference to FIG. 2, shown is an example illustrating exchanges between a host 110 and a data storage system 120 in an embodiment in accordance with techniques herein. In a first step, S1, the host sends the source device of the data storage system a populate token command identifying the source area, from which data is copied, as a set of one or more source ranges (e.g. different possibly non-contiguous LBA ranges) on the source device. The populate token command, as well as other described herein, may be SCSI commands. Although it should be noted that other commands providing functionality as described herein may be used whereby such commands may or may not be SCSI commands.

The command requests that the data storage system generate a token, also referred to as an opaque token. Generally, the opaque token represents the source area (e.g., representing the set of one or more source ranges on the source device) as well as the particular data contents stored in the source area at a point in time when the opaque token is generated. The opaque token is described in more detail below. The one or more source ranges representing the source area may be included as parameters in the populate token command along with possibly other parameters depending on the embodiment. The data storage system may send a response or reply R1 indicating receipt of the command S1 and successful generation of the requested token corresponding to the source area.

In a second step S2, the host may send another command request to the data storage system to obtain or retrieve the opaque token generated by the data storage system in S1 for the populate token command. In response R2, the opaque token may be returned to the host by the data storage system. The host may use the opaque token to request in a third step S3 to copy data from a source area (as represented by the opaque token) to a destination or target area.

In step S3 the host may issue a write using token (WUT) command request to a target device of the data storage system whereby the WUT command may specify the source area by including the opaque token in the WUT command. The WUT command request may be generally characterized as the request from the host to perform a data movement or copy operation from a source area to a target area whereby the source area is denoted or represented by the opaque token. Parameters specified in the WUT command request payload may also identify the target area as one or more target ranges (e.g. different possibly non-contiguous LBA ranges) described elsewhere herein. Additionally, the parameters of the WUT command request may include, for example, a copy location offset, such as in logical blocks. The entire set of source ranges specified as the source area may be collectively viewed as a single logical representation of source data whereby each of the source ranges may be appended or concatenated in the logical representation. The starting location from which data is copied may be determined with respect to such a collective logical representation of appended source ranges whereby the copy location offset represents an offset with respect to the start of the logical representation of the source area or collectively appended source ranges. For example, assuming the offset represents a number of blocks, the starting copy location of the source data to be copied is obtained by adding the block offset relative to the first location in the above-mentioned logical representation of the source ranges. The offset may be an integer that is equal to or greater than zero and does not exceed the size of the logical representation. It should be noted that the host issuing the WUT command request may be the same host or a different host (or more generally different client) than the host which performed steps S1 and S2. Additionally, a host can repeatedly issue multiple additional WUT commands to the data storage system whereby each such additional WUT command may use the same opaque token to identify the source area and each such additional WUT command may specify the same or a different target area.

It should be noted that use of the WUT command request may be characterized as in one aspect as the host offloading the data movement to the storage system. For example, the copy is performed with less consumption of host and network resources (e.g., the data to be copied is copied internally within the data storage system from the source to the target area as opposed to having the data to be copied transmitted from the data storage system to the host and then from the host to the data storage system).

The opaque token is a token representing the source area (e.g., representing the set of one or more source ranges on the source device) as well as the particular data contents stored at the source copy location at a point in time when the opaque token is generated. The opaque token may be generated using any suitable technique. The opaque token may be generally characterized as an identifier formed to uniquely represent the source copy location on the source device at the particular point in time when the token is generated. The token generated may be dependent upon (e.g., may be generated using), for example, the source area (e.g. set of subranges or logical block addresses of the source device) and the date and time information (e.g., date/time stamp) at which the token is generated and/or the actual data contents stored at the source area when the token is generated. Thus, the token may serve to represent a point in time copy of the source data stored at the source area. The technique used to generate the token may allow the data storage system to also, given the token, determine the source area (e.g., the one or more source ranges) and whether the data content stored at the source area has been modified since the token was previously generated.

When the data storage system receives the opaque token as in connection with the WUT command, the data storage system may perform processing to determine the source area (e.g., set of source ranges) and whether the data of the source area has been modified since the token was previously generated. If any data of the source area has been modified since the token was generated, the token may be invalidated since it no longer represents the same point in time copy of the source data at the source area. The particular token generated may be dependent upon the data of the source area so that if the data contents of the source area changes, the generated opaque token also changes. For example, assume a first token is generated at a first point in time using the data contents at the source area. Processing may be performed at a second later point in time to determine whether the token is still valid.

In one embodiment using the above-mentioned tokens, all the ranges of the source area denoted by the opaque token may be included in a single source device (e.g., all source ranges of the source area may identify LBA ranges of the same source LUN). The source device may be implicitly specified as the device to which the populate token command request is directed in S1. In a similar manner, all the ranges of the target area may be included in a single target device. The target device may be implicitly specified as the device to which the WUT command request is directed in S3. However, as a variation, the same techniques using tokens may be generally directed to a source area including multiple non-contiguous LBA ranges whereby such ranges are not all located on the same source device. Each of the one or more of the source ranges may be located in a different source device. For example, as described elsewhere herein, each of the source ranges may be included in a different source device. In such an embodiment, the populate token command request may allow a client to specify a particular source device for each of the source ranges. Accordingly, the opaque token may be generated to also reflect the particular source device associated with each such range. In a similar manner, the techniques using tokens may be generally directed to a target area including multiple non-contiguous LBA ranges whereby such ranges are not all located on the same target device. Each of the target ranges may be included in a different target device. In such an embodiment, the WUT command request may allow a client to specify a different target device for each of the ranges of the target area. Thus, the WUT command request may include parameters whereby for each target range, a target device associated with the target range may be identified.

In one embodiment, the ranges, copy location offset, and the like, may be expressed in terms of atomic units which are blocks. Each block may be, for example 512 bytes. Additionally, the commands described in the exchanges between the host and data storage system may be SCSI commands.

With reference back to FIG. 2, in response to command issued to the data storage system in S3, the data storage system may return a response R3 denoting, for example, the status of the requested command of S3 (e.g., whether the command was successfully executed by the data storage system).

Use of such a token-based exchange of commands between the host and data storage system provides for an accelerated copying technique for reading and writing data within the data storage system. Without use of the token based mechanism such as described herein, the host may otherwise have to issue a first command to read data from the data storage system whereby the data is returned to the host, and a second command to write the data to the data storage system at the target location. In contrast, the token-based exchange of commands as described herein may be used to accelerate copy operations and optimize data transfer requests initiated from the host without requiring transfer of the data to be copied from the data storage system to the host and then from the host back to the data storage system. With the token-based technique, the data storage system determines the source data included at a source area using the opaque token and the copy location offset specified in the WUT command.

In response to receiving the WUT command request, the data storage system may translate the WUT command request into a data movement bulk copy request. It should be noted that the WUT command request may be generally characterized as one way in which an external data storage system client may initiate a bulk copy request. Additionally, it should be noted that the data movement bulk copy request may be initiated as a data storage system internal request rather than from an external client copy request. The data storage system internal request may be performed, for example, in connection with various operations and tasks performed within the data storage system and its management activities. For example, there may be code executing on the data storage system that initiates and issues a bulk copy request.

Described in following paragraphs is an exemplary interface of code of the data storage system that may be invoked to perform the bulk copy operation. Additionally, also described in following paragraphs are further examples and processing steps that may be performed to implement the bulk copy operation in an embodiment in accordance with techniques herein.

The following is an example of an application programming interface (API), or more generally, a defined interface for a routine, function, method, or other code entity on the data storage system invoked to perform the bulk copy operation. The API may be a defined interface for code included in a library of the data storage system whereby a call is made to the API in response to receiving either an external client request (such as described above in connection with the WUT command) or an internally originated data storage system request. The following is an example of a defined interface of an API invoked to perform a bulk copy operation:

Perform_bulk_copy_operation (
  source device 1, starting offset1, length1, . . .
  source device n, starting offset n, length n,
  target device 1, starting offset1, length1, . . .
  target device M, starting offset M, length M,
  copy location offset)

The name of the body of code, such as a named function, routine or method, invoked is Perform_bulk_copy_operation. The parameters are described in following paragraphs. The source area may have a logical representation that is a concatenation of one or more appended source ranges. Each source range may be represented in the defined interface above as a source device/starting offset/length triple such as denoted by three parameters such as "source device 1", "starting offset1", and "length1". For example, the first source range is located on "source device 1", such as LUN 1, having a length or LBA range denoted by the parameter "length 1" and beginning at the LBA denoted by the parameter "starting offset 1". In accordance with the above-noted interface, the request may include up to "n" such triples or sets of three parameters for each source range. The maximum number of "n" source ranges possible may vary with embodiment and may generally include any suitable number of one or more source ranges.

The target area may have a logical representation that is a concatenation of one or more appended target ranges. Each target range may be represented in the defined interface above as a target device/starting offset/length triple such as denoted by three parameters such as "target device 1", "starting offset1", and "length1". For example, the first target range is located on "target device 1", such as LUN 10, having a length or LBA range denoted by the parameter "length 1" and beginning at the LBA denoted by the parameter "starting offset 1". In accordance with the above-noted interface, the request may include up to "M" such triples or sets of three parameters for each target range. The maximum number of "M" target ranges possible may vary with embodiment and may generally include any suitable number of one or more target ranges.

The "copy location offset" parameter may represent an offset in the source area denoting the starting or initial location of data to be copied to the target area. In one embodiment, each of the source and target range starting offsets (e.g., "starting offset1" . . . "starting offset n"), source and target range lengths (e.g., "length 1" . . . "length n"), and the "copy location offset" may be expressed in units such as logical blocks. If "copy_location_offset" is zero, it means that copying begins with data located at the start of the first source range. An embodiment may require that the size or total amount of data to be copied, as denoted by the source area less any amount due to a non-zero value of "copy location offset", match the size of the target area as denoted by the target range(s).

Figure 3:
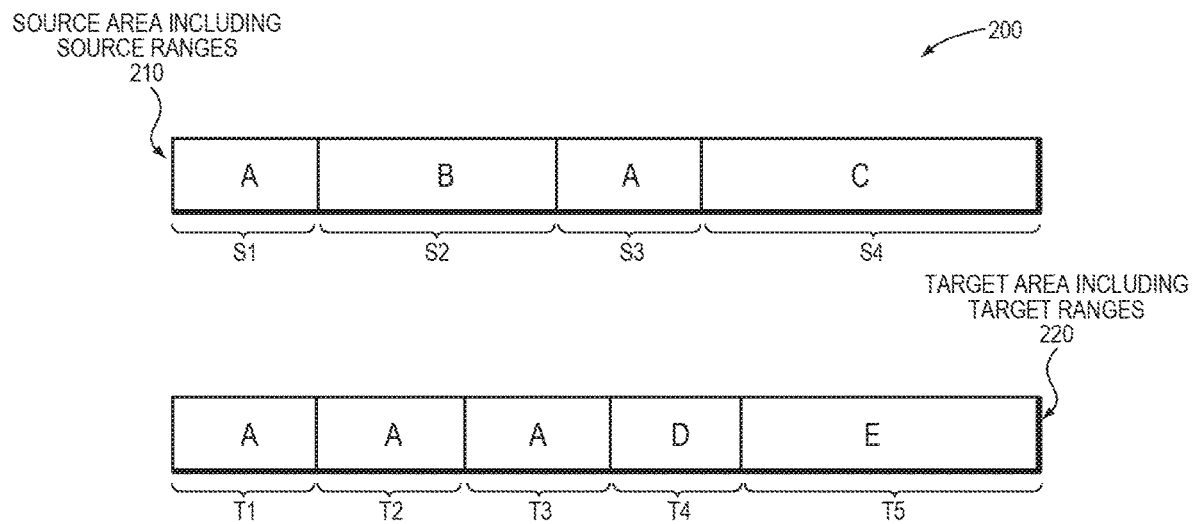
FIGS. 3, 4, 5 and 6 are examples illustrating use of techniques in an embodiment herein.

Referring to FIG. 3, shown is an example of a source area and a target area that may be used for performing a bulk copy operation in an embodiment in accordance with techniques herein. The example 200 includes a source area 210 which may include multiple source ranges. The target or destination area 220 may include multiple target ranges. In the example 200, the source area 210 includes 4 ranges (S1-S4) and the target area includes 5 ranges (T1-T5). Each of the foregoing ranges S1-S4 and T1-T5 may correspond to a logical address range portion of a device, such as a LUN. The logical address range portion may be, for example, expressed as a number of blocks whereby each block may represent some amount of storage such as 512 bytes. Each such range may be located on a device which may different or the same in comparison to other ranges. For example, the data storage system may include 4 LUNs-LUN 1, LUN 2, LUN 3 and LUN 4 whereby S1 may identify an LBA (logical block address) range on LUN 1, S2 may identify an LBA range on LUN 2, S3 may identify an LBA range on LUN 3 and S4 may identify an LBA range on LUN 4. As another example, S1 and S2 may identify different LBA ranges on the same LUN 3, and S3 and S4 may identify different LBA ranges on the same LUN 4. In a similar manner, each of the target ranges T1 through T5 may identify an LBA range of a LUN. For example, T1 and T2 may represent different LBA ranges on the same LUN 2 and T3, T4 and T5 may each identify an LBA range on the same LUN 4.

The example 200 also denotes the size of each range in 210 and 220 as represented using letters "A"-"E" in FIG. 3. "A" may represent the number of blocks in length spanning each of S1, S3, T1 and T3 (e.g., S1, S3, T1 and T3 are each of the same size). "B" may represent the number of blocks in length spanning S2. "C" may represent the number of blocks in length spanning S4. "D" may represent the number of blocks in length spanning T4. "E" may represent the number of blocks in length spanning T5.

Thus, an embodiment in accordance with techniques herein may provide for specifying source ranges and target ranges of different sizes whereby each of the ranges may be located on the same or different devices of the data storage system. The number of source ranges may be the same or may differ from the number of target ranges. Additionally, each such source range may be on the same or different device (e.g., LUN) with respect to the other source ranges. Each such source range may be the same or different size with respect to other source ranges. Each source range may also identify the same or different LBA ranges with respect to the other source ranges. Similarly, each target range may be on the same or different device with respect to the other target ranges, may be the same or different size with respect to other target ranges, and may identify the same or different LBA ranges with respect to the other target ranges.

For purposes of performing the bulk copy operation, whereby data is copied from the source area (comprising one or more source ranges of one or more source devices) to the target area (comprising one or more target ranges of one or more target devices), the entire set of source ranges specified as the source area 210 may be collectively viewed as a single logical representation of source data whereby each of the source ranges may be appended or concatenated in the logical representation. An embodiment may allow for the copy operation to specify an offset, also referred to as the copy location offset herein, denoting the starting copying location within the source area from which copying is to commence. In other words, the first byte of data that is copied from the source area may be located at an offset within the specified source area. Such a copy location offset may be 0 or may be an integer value greater than zero. Thus, the starting location from which data is copied may be determined with respect to such a logical representation 210 of appended source ranges whereby the copy location offset represents an offset with respect to the start of the logical representation of the source area. For example, assuming the copy location offset represents a number of blocks, the starting copy location of the source data in the source area is obtained by adding the block offset relative to the first location in the above-mentioned logical representation of the source ranges. The copy location offset may be an integer that is equal to or greater than zero and does not exceed the size of the logical representation of the source area. A copy location offset of zero means copying begins with data located at the first byte of the logical representation of the source area. In a similar manner, the entire set of target ranges specified as the target area 220 may be collectively viewed as a single logical representation of a target whereby each of the target ranges may be appended or concatenated in the logical representation.

Data may be copied from the source area 210 to the target area 220. Each block of source data that is copied from the source area may have a relative displacement, D1, from the initial block or starting point in the source area from which data is copied (e.g., starting point from which data is copied from the source area is determined by the copy location offset). D1 may be, for example, a positive integer value representing a displacement in terms of number of blocks from the location in the source area of the initial or first block of the source data that is copied. A block of source data is copied to a target location in the target area whereby the target location has a corresponding displacement D1 relative to the first or initial location in the target area.

Figure 4:
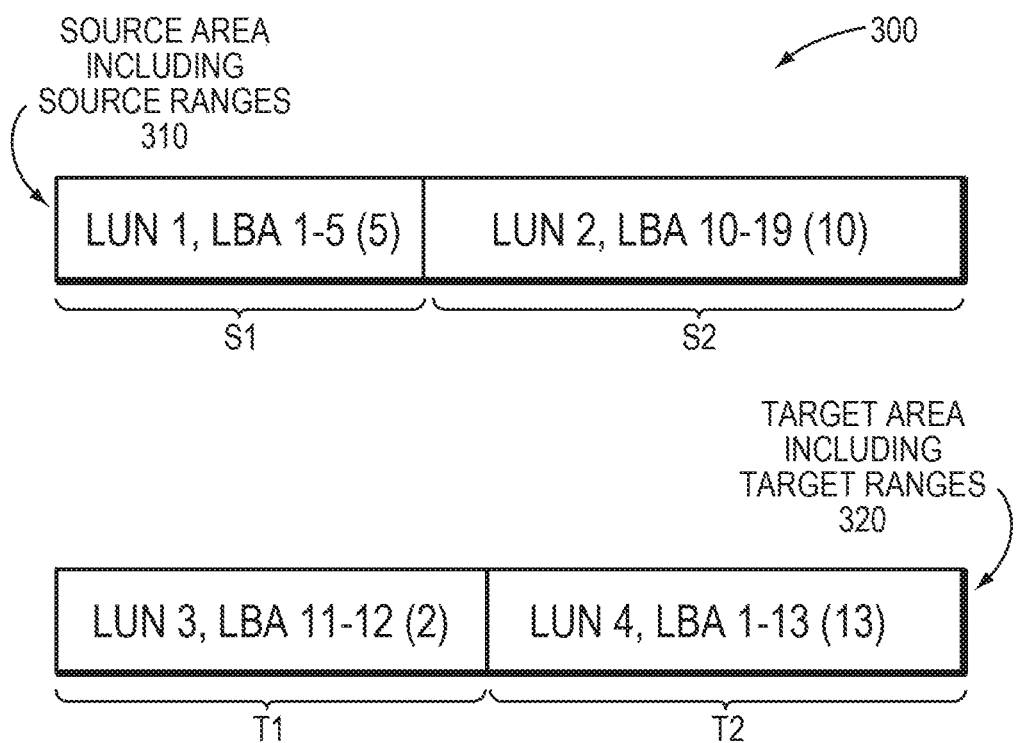

For example, with reference to FIG. 4, shown is an example 300 where data is copied from source area 310 having source ranges S1 and S2 whereby S1 is LUN 1, LBA range 1-5 (length 5 blocks) and S2 is LUN 2, LBA range 10-19 (length 10 blocks). The example 300 includes a target area having target ranges T1 and T2 whereby T1 is LUN 3, LBA range 11-12 (2 blocks) and T2 is LUN 4, LBA range 1-13 (length 13 blocks). Assume that an offset of zero is specified meaning that the first block of data copied corresponds to the first block of the source area, LUN 1, LBA 1. The source area 310 has a size of 15 blocks and the target area 320 has a size of 15 blocks so that data from block 1 of the source area (e.g., LUN 1, LBA 1) is copied to block 1 of the target area (e.g. LUN 3, LBA 11), data from block 2 of the source area (e.g., LUN 1, LBA 2) is copied to block 2 of the target area (e.g., LUN 3, LBA 12), data from block 3 of the source area (e.g., LUN 2, LBA 10) is copied to block 3 of the target area (e.g., LUN 4, LBA 1) and the like, with respect to the remaining locations of the source and target areas of 300.

Figure 5:
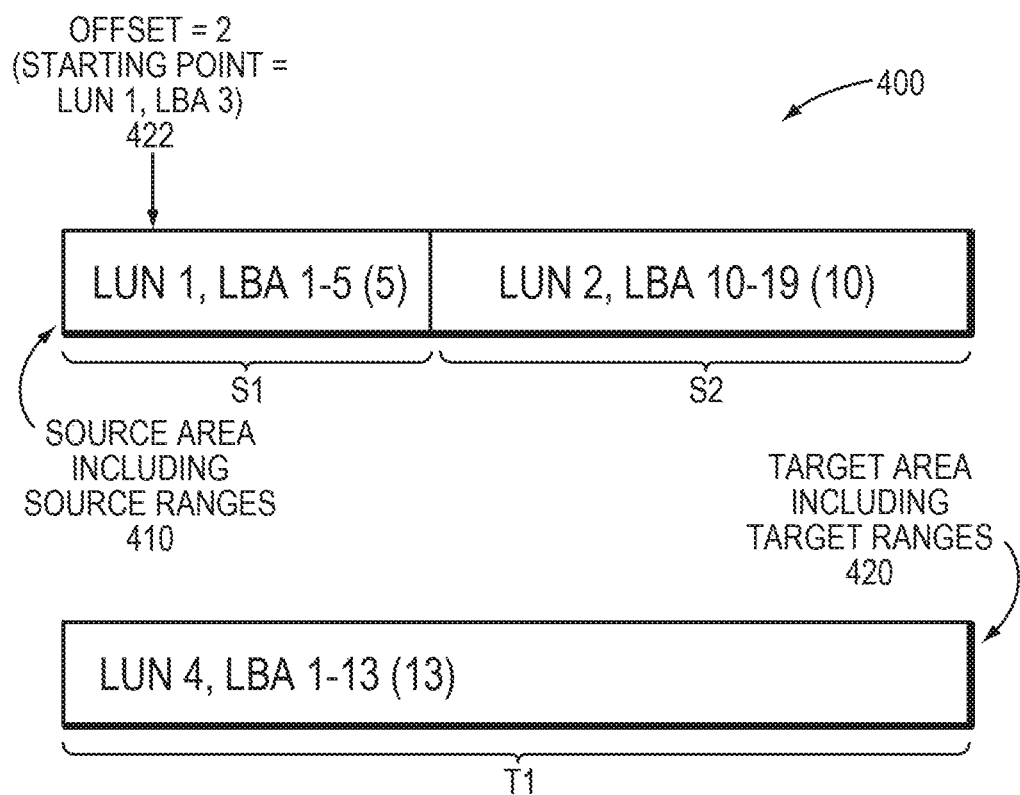

As a variation illustrating use of a non-zero offset within the source area denoting a starting location in the source area, reference is now made to FIG. 5. The example 400 includes source area 410 and target area 420. The source area 410 includes source ranges S1 and S2 as described in connection with the example 300. In this example, assume copying commences within the source area at copy location offset 3 thereby indicating that the first block of data of the source area that is copied is LUN 1, LBA 3 (as denoted by 422 whereby "3" denotes the third block in the source area, LUN 1, LBA 3, as the starting LBA location of the first block of data of the source area to be copied). Thus, a total of 13 blocks of data are copied from the source area. The target area 420 also has a size of 13 blocks as represented by the single target range T1 located at LUN 4, LBA 1-13. Although LUN 1, LBA 3 may be characterized as being located at block offset 3 within the source area, LUN 1, LBA 3 may be further characterized as having a displacement of 0 whereby the displacement is with respect to the starting location (block) of the data to be copied. In this manner, the first block of data to be copied is LUN 1, LBA 3 having a displacement=0 (whereby the displacement is with respect to the initial or first block of copied data) which is copied to a corresponding location LUN 4, LBA 1 in the target area (e.g., having a displacement=0 with respect to the start of the target area where the first block of data is copied.) The second block of data to be copied is LUN 1, LBA 4 having a displacement=1 which is copied to a corresponding location LUN 4, LBA 2 in the target area (e.g., having a displacement=1 with respect to the start of the target area.) The third block of data to be copied is LUN 2, LBA 10 having a displacement=2 which is copied to a corresponding location LUN 4, LBA 3 in the target area (e.g., having a displacement=2 with respect to the start of the target area.) In a similar manner, the remaining blocks of data of the source area 410 may be copied to corresponding locations in the target area 420.

Thus, generally, a block of source data has a displacement D denoting the offset with respect to the initial or first block of source data copied. The initial or first block of source data copied may be located at the start of the source area, or may be located at an offset or number of blocks within the source area as denoted by a copy location offset. A block of source data that is copied from the source area to the target area may be characterized as having a displacement D with respect to the first block of source data copied, and the block of data is copied to a corresponding location in the target area having displacement D with respect to the first location in the target area to which the first block of source data is copied.

In connection with copying data from the source area to the target area for a bulk copy operation, an embodiment may specify an interface, such as an API described elsewhere herein, with one or more parameters which identify the source ranges and associated source devices comprising the source area, the target ranges and associated target devices comprising the target area, and a copy location offset (within the source area at which the first block of data to be copied is located). The interface may also optionally include other parameters providing other information as may be used in an embodiment. The interface may be used to issue a request or call to code to perform the bulk copy operation whereby data is copied from the source area to the target area in a manner consistent with description herein in accordance with the specified parameters.

In one embodiment, the processing to perform the bulk copy operation may partition the bulk copy operation into multiple requests whereby each of the requests copies a portion of the data from the source area to the target area. In one embodiment, each request may copy the same amount of data. The size indicating the amount of data copied by each request may be determined as the largest size by which each of the source and target ranges can be evenly partitioned (e.g., with no remainder) whereby the request to copy a portion of the source data does not span or cross multiple source ranges and also does not span or cross multiple target ranges (e.g., since each of the foregoing ranges may be on a different device). It should also be noted that the size may also be determined in accordance with the foregoing, alone or in combination with, one or more other criteria such as, for example, data storage system-specific knowledge (e.g., maximum cache page size, multiple of a cache page size, and the like). Of course, the size of each data portion copied by a request may be subject to any further restrictions or limits that may be imposed by an embodiment. For example, the size of each data portion may be subject to a maximum size, boundary requirements (e.g., the data portion must be on a block boundary such as in units of 512 bytes), and the like.

Figure 6:
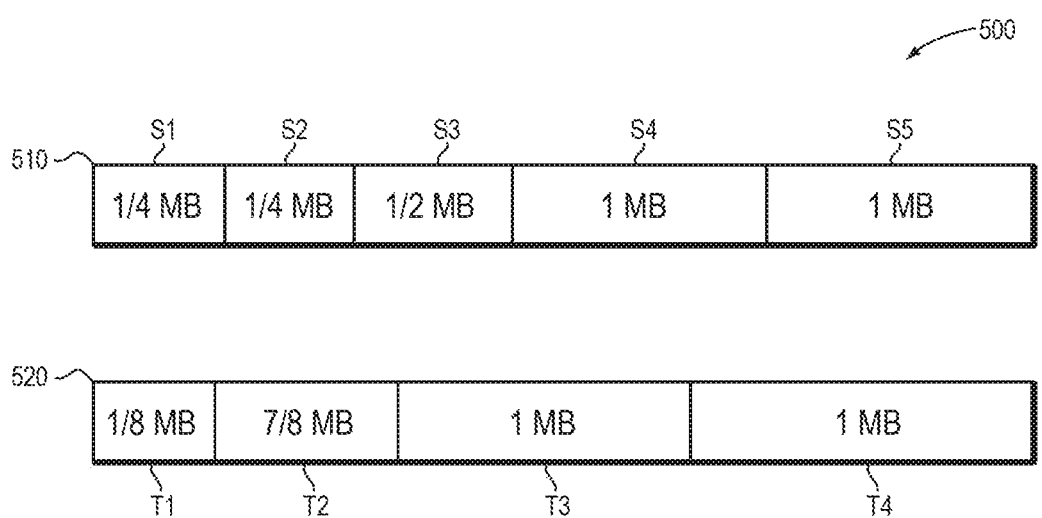

For example, with reference to FIG. 6, consider source area 510 including 5 source ranges S1-S5 and target area 520 including target ranges T1-T4. For ranges have the following sizes: S1 is ¼ MB (megabyte), S2 is ¼ MB, S3 is ½ MB, S4 is 1 MB, S5 is 1 MB, T1 is ⅛ MB, T2 is ⅞ MB, T3 is 1 MB and T4 is 1 MB. Based on the foregoing assuming copying begins from the source area at offset 0 (e.g., copy location offset is zero within the source area), the source and target areas are each 3 MB. The largest size by which each of the source and target ranges can be evenly partitioned is ⅛ MB. An embodiment may thus select ⅛ MB as the size of each request and perform the bulk copy operation to copy 3 MB of data from the source area by issuing 24 requests whereby each request copies a different ⅛ MB data portion from the source area to a corresponding location in the target area. In this example, the size of each range in the source area and target area may be expressed in terms of some unit, such as a integer number of MBs, and, as may be needed, some fraction thereof so that the amount of data copied by each request may be determined as the LCD (least common denominator) of the size of all such ranges. The LCD with respect to the size of all source and target ranges may be used to express the amount of data copied by each request if any such range has a size which, when expressed in terms of the MB or other unit, includes a fractional portion (e.g., each range does not specify an integer number of MBs but rather may include some fractional portion of a MB).

If the size of each range is an integer quantity with no fractional portion of MB, the amount of data copied by each request may be expressed as the largest factor which evenly divides all such sizes. For example, let the source area include 2 source ranges having the sizes 2 MB and 4, MB and the target area include a single target range of 6 MB. In this case, the amount of data copied by each request may be 2 MB (e.g., 2 is the largest number that evenly divides 2, 4 and 6) and the bulk copy operation may be performed by issuing 3 requests each copying 2 MB of data from the source area to the target area. Thus, the total number of requests needed to copy of all the source data from the source area may be determined as the total amount of data to be copied from the source area divided by the amount of data copied by each request.

With reference back to FIG. 6, the above-mentioned example was made with the assumption of a copy offset location in the source area of zero. If the copy offset location is non-zero, the above-mentioned processing may be accordingly modified such that a partitioned request to a copy a data portion of the source area to the target area does not span across any boundaries of the source ranges or the target ranges. For example with reference back to FIG. 6, assume the following variation. The source area is as illustrated by 510 of FIG. 6 with source ranges S1, S2, S3 S4 and S5. The target area does not include T1 and rather only includes T2, T3 and T4 as illustrated by 520. The copy location offset is ⅛ MB. Thus, the amount of data to be copied using the ⅛ MB offset within 510 is 2⅞ MB which also matches the size of the target area. In this case, rather than use a size of ¼ MB for S1, ⅛ MB is used as the size of S1 representing the amount of data copied from S when determining the amount of each data portion of the source area to be copied by each partitioned request. In this latter example, the initial bulk copy operation request may be partitioned into 24 requests each copying ⅛ MB of source data whereby each of the 24 partitioned requests does not span across any source range boundaries and also do not span across any target range boundaries (e.g., each ⅛ MB data portion that is copied is included in the source area at a location that does not span across a boundary of any of the one or more source ranges. Additionally, each ⅛ MB data portion of source data is copied to a corresponding location in the target area that does not span across a boundary of any of the one or more target ranges.

Figure 7:
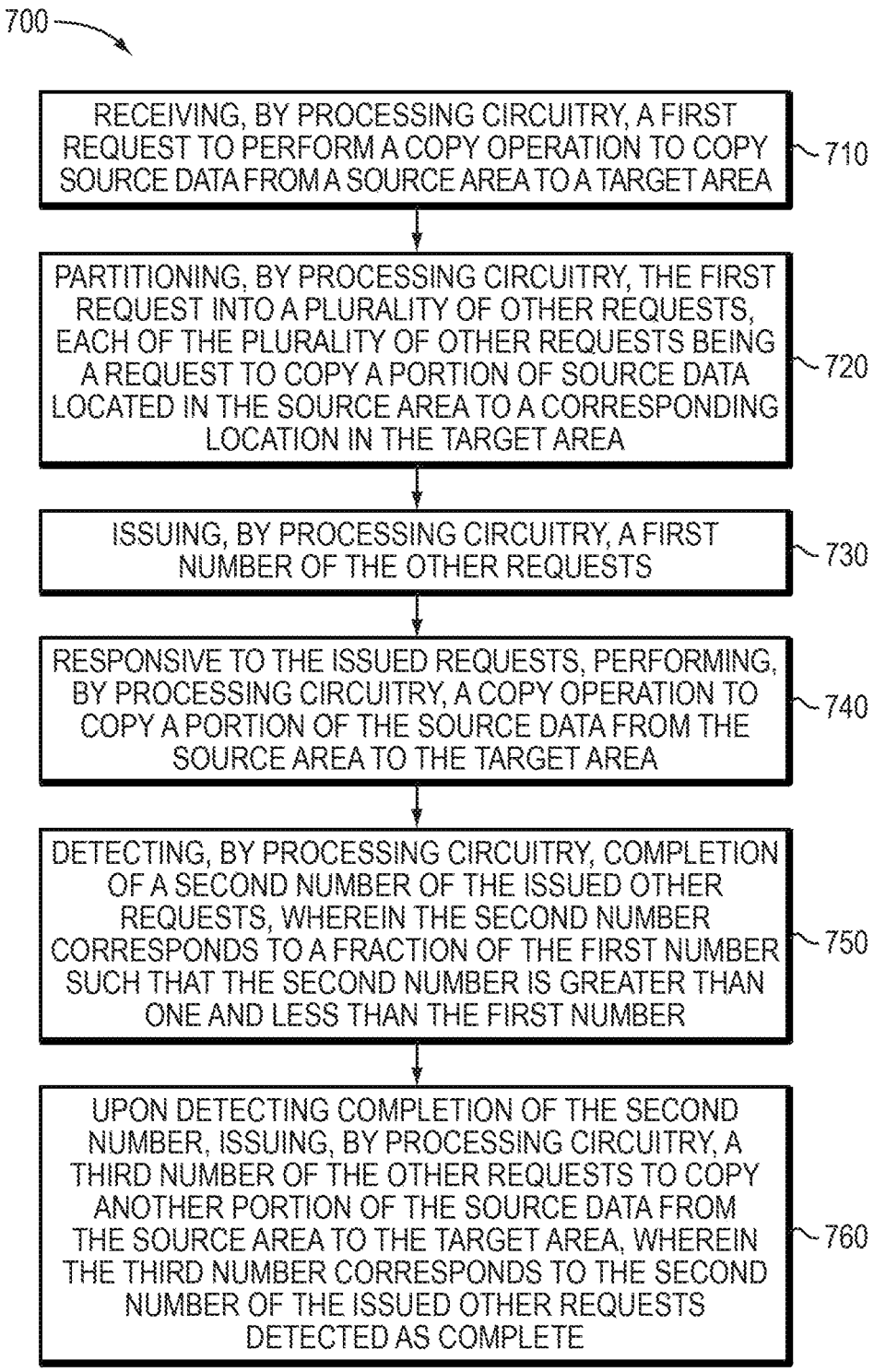
FIG. 7 is a flowchart including processing steps that may be performed in an embodiment in accordance with techniques herein.

Referring to FIG. 7, shown is a flowchart of processing steps 700 summarizing processing that may be performed in an embodiment herein to perform a bulk copy operation. At step 710, a first request is received to perform a copy operation to copy source data from a source area to a target area. At step 720, the first request is partitioned into a plurality of other requests. Each of the plurality of other requests being a request to copy a portion of source data located in the source area to a corresponding location in the target area. At step 730, a first number of the other requests is issued. At step 740, responsive to the issued requests, a copy operation is performed to copy a portion of the source data from the source area to the target area. At step 750, a second number of the issued other requests is detected as complete. The second number corresponds to a fraction of the first number such that the second number is greater than one and less than the first number. At step 760, upon detecting completion of the second number, a third number of the other requests is issued to copy another portion of the source data from the source area to the target area. The third number corresponding to the second number of the issued other requests detected as complete.

It should be appreciated that the technique as described above is able to process a request to copy source data from a source area to a target more efficiently by partitioning the request into a plurality of other requests and distributing a first number of sequential other requests to different processor cores. The requests are subsequently handled by the different processor cores. However, as will be described further below, the requests handled by these processor cores may complete out of order due to the racing nature of the processor cores. This has an impact on a cache pre-fetcher that attempts to anticipate the next batch of other requests to be issued by pre-fetching source data. The invention resolves this matter by waiting for a second number (i.e., a fraction of the first number) of the issued requests to complete before issuing a third number of sequential other requests. This enables the pre-fetcher to successfully anticipate the next batch of other requests.

Previously, the request to copy source data is partitioned into a plurality of other requests. For example, requests 0, 1, 2, 3 are issued on CPU 0. It is then decided to fan or distribute those 4 requests to different processor cores (e.g., CPU 0, CPU 1, CPU 2, CPU 3), respectively. Now, suppose CPU 3, CPU 1, CPU 2, CPU 0 complete the requests. The completions are detected on independent CPUs, and further requests are issued on those same CPUs.

CPU 3 is assigned request 4
CPU 1 is assigned request 5
CPU 2 is assigned request 6
CPU 0 is assigned request 7

Here, it should be appreciated that just due to the nature of racing CPUs the requests arrive at the backend in this order: CPU 0, CPU 3, CPU 2, CPU 1. So the backend sees the requests in this order: 7, 4, 6, 5. However, a backend pre-fetcher that fetches data for a cache in an attempt to anticipate future requests has no idea how to handle the requests. It thinks that the stream is random and it doesn't engage the pre-fetcher logic.

Advantageously, the technique as described herein adds logic in the completion path to batch up those completions to wait for a second number of the issued N requests to complete (i.e., the second number corresponds to N/2). In the example provided above, the technique would wait for a fraction of the first number of requests that issued to complete before issuing any further requests. For example, in this embodiment, the technique waits for N/2 or 2 requests to complete before issuing further requests. The completions and issuance of requests would be handled like this:

CPU 3 completes, there is 1 credit, but waiting on N/2 (or 2).
CPU 1 completes, there is now 2 credits. Requests 4/5 are issued on CPU1 (N.B., the CPU1 may distribute the requests 4/5 between CPU3 and CPU1 to achieve parallel requests).
The backend sees the requests arrive in a sequential order and can engage the pre-fetcher.
CPU 2 completes, there is 1 credit, but waiting on N/2 (or 2).
CPU 0 completes, there is now 2 credits. Requests 6/7 are issued on CPU0. (N.B., the CPU0 may distribute the requests 6/7 between CPU2 and CPU0 to achieve parallel requests)

It should be appreciated that while the above example describes 4 requests it does not necessarily have to be this number. For example, the first number N of issued requests may be 8, while the technique waits for a second number of completions such as N/2 or 4. The new batch of requests, or a third number to be issued after detecting the aforementioned completions, will also be 4 such that the 4 new requests will be issued to copy a further portion of source data. The technique may also issue further requests once the 4 other requests part of the first number complete, and so on.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method, comprising:
receiving a request to copy source data from a source area to a target area; in response to receiving the request, partitioning the request into a plurality of first sub-requests for facilitating the copying of respective portions of the source data from the source area to the target area;
selecting a second number of sub-requests from the plurality of first sub-requests to enable sequential issuance of the sub-requests, wherein the second number is greater than three and less than the first number;
issuing the second number of sub-requests such that each processing resource of a first number of processing resources issues one of the second number of subrequests;
detecting that a predetermined third number of the issued second number of sub-requests has completed copying of respective portions of the source data from the source area to the target area, wherein the predetermined third number is greater than one and less than the second number, wherein the said detecting comprises detecting the processing resources that have completed the predetermined third number of the issued second number of sub-requests;
upon detecting the predetermined third number, and based on the selection of the second number of sub-requests, selecting a fourth number of sub-requests from the plurality of first sub-requests to enable sequential issuance of the first sub-requests, wherein the fourth number is equivalent to the predetermined third number; and issuing the fourth number of sub-requests such that each of the respective fourth number of sub-requests is issued by one of the detected processing resources.

2. The method as claimed in claim 1, further comprising:
based on the issued second number of sub-requests, performing a pre-fetch operation to pre-fetch data from the source area for a cache; and
responsive to the issued fourth number of sub-requests, retrieving the pre-fetched data from the cache to service the copying of the another portion of the source data from the source area to the target area.

3. The method as claimed in claim 1, wherein the second and the fourth number of sub-requests are issued by cores of a multi-core processor.

4. The method as claimed in claim 1, wherein the third number corresponds to one of a half or a quarter or an eighth of the second number.

5. An apparatus, comprising:
a memory; and
processing circuitry coupled to the memory, the memory storing instructions which, when executed by the processing circuitry, cause the processing circuitry to:
receive a request to copy source data from a source area to a target area;
in response to receiving the request, partition the request into a plurality of first sub-requests for facilitating the copying of respective portions of the source data from the source area to the target area;
select a second number of sub-requests from the plurality of first sub-requests to enable sequential issuance of the sub-requests, wherein the second number is greater than three and less than the first number;
issue the second number of sub-requests such that each processing resource of a first number of processing resources issues one of the second number of subrequests;
detect that a predetermined third number of the issued second number of sub-requests has completed copying of respective portions of the source data from the source area to the target area, wherein the predetermined third number is greater than one and less than the second number, wherein the said detecting comprises detecting the processing resources that have completed the predetermined third number of the issued second number of sub-requests;
upon detecting the predetermined third number, and based on the selection of the second number of sub-requests, select a fourth number of sub-requests from the plurality of first sub-requests to enable sequential issuance of the first sub-requests, wherein the fourth number is equivalent to the predetermined third number; and
issue the fourth number of sub-requests such that each of the respective fourth number of sub-requests is issued by one of the detected processing resources.

6. The apparatus as claimed in claim 5, wherein the memory stores instructions which, when executed by the processing circuitry, cause the processing circuitry to:
based on the issued second number of sub-requests, performing a pre-fetch operation to pre-fetch data from the source area for a cache; and
responsive to the issued fourth number of sub-requests, retrieving the pre-fetched data from the cache to service the copying of the another portion of the source data from the source area to the target area.

7. The apparatus as claimed in claim 5, wherein the second and the fourth number of sub-requests are issued by cores of a multi-core processor.

8. The apparatus as claimed in claim 5, wherein the third number corresponds to one of a half or a quarter or an eighth of the second number.

9. A computer program product including a set of non-transitory, computer-readable media having instructions which, when executed by processing circuitry, cause the processing circuitry to perform a method, the method comprising:
receiving a request to copy source data from a source area to a target area;
in response to receiving the request, partitioning the request into a plurality of first sub-requests for facilitating the copying of respective portions of the source data from the source area to the target area;
selecting a second number of sub-requests from the plurality of first sub-requests to enable sequential issuance of the sub-requests, wherein the second number is greater than three and less than the first number;
issuing the second number of sub-requests such that each processing resource of a first number of processing resources issues one of the second number of subrequests;
detecting that a predetermined third number of the issued second number of sub-requests has completed copying of respective portions of the source data from the source area to the target area, wherein the predetermined third number is greater than one and less than the second number, wherein the said detecting comprises detecting the processing resources that have completed the predetermined third number of the issued second number of sub-requests:
upon detecting the predetermined third number, and based on the selection of the second number of sub-requests, selecting a fourth number of sub-requests from the plurality of first sub-requests to enable sequential issuance of the first sub-requests, wherein the fourth number is equivalent to the predetermined third number; and
issuing the fourth number of sub-requests such that each of the respective fourth number of sub-requests is issued by one of the detected processing resources.

10. The computer program product as claimed in claim 9, further comprising:
based on the issued second number of sub-requests, performing a pre-fetch operation to pre-fetch data from the source area for a cache; and
responsive to the issued fourth number of sub-requests, retrieving the pre-fetched data from the cache to service the copying of the another portion of the source data from the source area to the target area.

11. The computer program product as claimed in claim 9, wherein the second and the fourth number of sub-requests are issued by cores of a multi-core processor.

12. The computer program product as claimed in claim 9, wherein the third number corresponds to one of a half or a quarter or an eighth of the second number.

* * * * *